(12) United States Patent
Park et al.

(10) Patent No.: US 11,386,553 B2
(45) Date of Patent: Jul. 12, 2022

(54) MEDICAL IMAGE DATA

(71) Applicants: Siemens Healthcare GmbH, Erlangen (DE); New York University, New York, NY (US)

(72) Inventors: Jin-hyeong Park, Princeton, NJ (US); Sasa Grbic, Plainsboro, NJ (US); Matthias Fenchel, Erlangen (DE); Esther Raithel, Dormitz (DE); Dana Lin, New York, NY (US)

(73) Assignees: Siemens Healthcare GmbH, Erlangen (DE); New York University, New York, NY (US)

( * ) Notice: Subject to any disclaimer, the term of this patent is extended or adjusted under 35 U.S.C. 154(b) by 179 days.

(21) Appl. No.: 16/598,382

(22) Filed: Oct. 10, 2019

(65) Prior Publication Data
US 2020/0167911 A1 May 28, 2020

(30) Foreign Application Priority Data
Nov. 22, 2018 (EP) .................................... 18207738

(51) Int. Cl.
*G06T 7/00* (2017.01)
*G06T 7/11* (2017.01)
(Continued)

(52) U.S. Cl.
CPC ............. *G06T 7/0012* (2013.01); *G06N 3/02* (2013.01); *G06T 7/11* (2017.01); *G06V 10/25* (2022.01);
(Continued)

(58) Field of Classification Search
CPC ................... G06T 7/0012; G06T 7/11; G06T 2207/20084; G06T 2210/12;
(Continued)

(56) References Cited

U.S. PATENT DOCUMENTS

2003/0236686 A1  12/2003  Matsumoto et al.
2018/0060723 A1*  3/2018  Nakano ................ G06N 3/0454
(Continued)

FOREIGN PATENT DOCUMENTS

WO    WO2018204404 A1    11/2018

OTHER PUBLICATIONS

Zarandi M H et al: "A Computer-Aided Type—II Fuzzy Image Processing for Diagnosis of Meniscus Tear"; Journal of Digital Imaging; Springer-Verlag; Cham; vol. 29; No. 6; May 19, 2016 (May 19, 2016); pp. 677-695 (Year: 2016).*
(Continued)

*Primary Examiner* — Van D Huynh

(57) ABSTRACT

Medical image data is received at a data processing system, which is an artificial intelligence-based system. An identification process is performed at the data processing system to identify a subset of the medical image data representing a region of interest including one or more target tendons. A determination process is performed at the data processing system to determine one or more characteristics relating to one or more abnormalities of the one or more target tendons. Abnormality data is output, the abnormality data relating to the one or more abnormalities and being based on the one or more characteristics.

15 Claims, 6 Drawing Sheets

(51) Int. Cl.
*G06N 3/02* (2006.01)
*G06V 10/25* (2022.01)

(52) U.S. Cl.
CPC .............. *G06T 2207/20084* (2013.01); *G06T 2210/12* (2013.01)

(58) Field of Classification Search
CPC . G06T 2207/30008; G06T 2207/10088; G06T 2207/20081; G06K 9/3233; G06K 9/6267; G06N 3/02
USPC .......................................................... 382/128
See application file for complete search history.

(56) References Cited

U.S. PATENT DOCUMENTS

| | | | |
|---|---|---|---|
| 2018/0225823 | A1 | 8/2018 | Zhou et al. |
| 2019/0236779 | A1* | 8/2019 | Hattori .................. G16H 30/40 |
| 2019/0318828 | A1* | 10/2019 | Li .......................... G06N 20/00 |
| 2020/0069257 | A1* | 3/2020 | Fleming ................. G06T 7/174 |
| 2020/0219609 | A1* | 7/2020 | Harte ....................... G06N 3/04 |

OTHER PUBLICATIONS

Gupta, et al.: "Curvelet based automatic segmentation of supraspinatus tendon from ultrasound image: a focused assistive diagnostic method"; Biomedical Engineering Online; Biomed Central Ltd; London, GB; vol. 13; No. 1/157; Dec. 4, 2014 (Dec. 4, 2014); pp. 1-18 (Year: 2014).*

Ronneberger, et al.; "U-net: Convolutional networks for biomedical image segmentation." International Conference on Medical image computing and computer-assisted intervention. Springer, Cham, 2015.

Xu, et al.; "Supervised action classifier: Approaching landmark detection as image partitioning." International Conference on Medical Image Computing and Computer-Assisted Intervention. Springer, Cham, 2017.

Okoroha, et al.; "Characterization of rotator cuff tears: ultrasound versus magnetic resonance imaging." Orthopedics 40.1 (2017): e124-e130.

Xu, et al.; . "Less is more: Simultaneous view classification and landmark detection for abdominal ultrasound images." International Conference on Medical Image Computing and Computer-Assisted Intervention. Springer, Cham, 2018.

Chen, et al; "Iterative multi-domain regularized deep learning for anatomical structure detection and segmentation from ultrasound images." International Conference on Medical Image Computing and Computer-Assisted Intervention. Springer, Cham, 2016.

Yang, et al.; "Automatic vertebra labeling in large-scale 3D CT using deep image-to-image network with message passing and sparsity regularization." International Conference on Information Processing in Medical Imaging. Springer, Cham, 2017.

George S. Athwal, MD et al. "Rotator Cuff Tears" Mar. 2017. pp. 1-9.

Yang, et al.; "Deep Image-to-Image Recurrent Network with Shape Basis Learning for Automatic Vertebra Labeling in Large-Scale 3D CT Volumes"; in: MICCAI; pp. 498-506; 2017.

Zarandi M H et al: "A Computer-Aided Type—II Fuzzy Image Processing for Diagnosis of Meniscus Tear"; Journal of Digital Imaging; Springer-Verlag; Cham; vol. 29; No. 6; May 19, 2016 (May 19, 2016); pp. 677-695.

Syed; "Patellar Ligament Tear Detection using Machine Learning"; 2011; pp. 1-5; Retrieved from the Internet: URL: https://pdfs.semanticscholar.org/a852/3cc5631b7a923e5e2bd9ed34364a726ad0c3.pdf.

Gupta, et al.: "Curvelet based automatic segmentation of supraspinatus tendon from ultrasound image: a focused assistive diagnostic method"; Biomedical Engineering Online; Biomed Central Ltd; London, GB; vol. 13; No. 1/157; Dec. 4, 2014 (Dec. 4, 2014); pp. 1-18.

Park, et al.; "Texture Analysis of Supraspinatus Ultrasound Image for Computer Aided Diagnostic System"; Healthcare Informatics Research; vol. 22; No. 4; 2016; pp. 299-304.

Extended European Search Report (EESR) dated Jun. 7, 2019 in corresponding European Patent Application No. EP 18207738.

* cited by examiner

First segmentation process

Landmark detection process

MEDICAL IMAGE DATA

RELATED CASE

This application claims the benefit of EP 18207738.8, filed on Nov. 22, 2018, which is hereby incorporated by reference in its entirety.

TECHNICAL FIELD

The present embodiments relate to processing medical image data. The processing involves a data processing system which is an artificial intelligence-based system.

BACKGROUND

Medical imaging techniques may be used to obtain information regarding a human or animal body. For example, X-ray images can be used to detect and classify bone fractures. In another example, Magnetic Resonance Imaging (MRI) can be used to image tissues of the body.

Image data such as MRI image data may be used to determine the characteristics of abnormalities. For example, MRI image data may be used to detect suspected tendon or muscle tears such as tears of the rotator cuff muscles or tendons. However, the procedure to do so can be complex and time consuming. For example, one or more MRI image series may be acquired in one or more imaging planes (for example, the sagittal plane, coronal plane and transverse plane) resulting in a large number of images. A medical professional may then manually examine the large number of images in order to detect tears and manually determine relevant characteristics of a tear if detected.

Therefore, detecting abnormalities such as tendon tears using medical image data such as MRI image data requires significant resources (e.g. a medical professional's time and effort). Furthermore, the process of detecting abnormalities in this way is subject to inter-observer variability. For example, different medical professionals may arrive at different conclusions regarding the abnormality, may report their finding differently, etc.

It is an object of the present invention to address at least some of the difficulties with the procedure for analyzing medical image data.

SUMMARY

According to a first aspect, there is provided a method for processing medical image data. The method includes: receiving medical image data at a data processing system, the data processing system being an artificial intelligence-based system; performing, at the data processing system, an identification process to identify a subset of the medical image data representing a region of interest including one or more target tendons; performing, at the data processing system, a determination process including processing the subset of medical image data to determine one or more characteristics relating to one or more abnormalities of the one or more target tendons; and outputting abnormality data relating to the one or more abnormalities, the abnormality data being based on the one or more characteristics.

The first aspect advantageously provides a method of processing medical image data without direct involvement of a medical professional and expenditure of their time and effort. The method uses an artificial intelligence based system, and therefore automates the otherwise complex and time consuming manual procedure of determining the characteristics of abnormalities.

First identifying a region of interest by identifying a subset of the medical image data advantageously means that subsequent processing (i.e. the determination process) is performed only on the parts of the medical image data that are relevant. In contrast to the first aspect, known manners of image classification using artificial intelligence-based systems may not be straightforwardly applied to classifying medical image data. This is because the information about the one or more abnormalities (e.g. tendon tears) may be strongly localized, with the bulk of the medical image data carrying no relevant information about the one or more abnormalities.

In accordance with the first aspect, only the parts of the medical image data that are relevant are processed further. This may decrease the time required to perform the processing of the same medical image data over prior art methods. Furthermore, the results achieved by the method according to the first aspect may be more accurate over prior art methods because only the relevant data is processed and the results are not influenced by irrelevant medical image data.

Optionally, the identification process includes: a segmentation process to determine a mask relating to the one or more target tendons in the medical image data; a landmark detection process to detect at least one landmark relating to the one or more target tendons; or a regression process, herein referred to as an identification regression process, to locate a bounding box around at least a part of the one or more target tendons.

A segmentation process advantageously leads to the one or more target tendons being identified in the medical image data so that the region of interest is accurately identified. A segmentation process may therefore advantageously provide great accuracy in the determination of the region of interest.

A landmark detection process may advantageously be less computationally expensive than a segmentation process while still providing good accuracy for the determination of the region of interest.

The identification regression process may advantageously not require a separate task to be performed in order for the region of interest to be identified. This is because the bounding box may be positioned over the region of interest such that an additional procedure for identifying the region of interest based on the result of the identification regression process is not needed.

Optionally, the region of interest is a shoulder region of a human or animal body.

The region of interest being a shoulder region means that characteristics of abnormalities of tendons in the shoulder region can be determined. Abnormalities such as injuries to tendons in the shoulder region may occur and can advantageously be assessed using the method according to the first aspect.

Optionally, the one or more target tendons include at least one of: the tendon of the Supraspinatus muscle; the tendon of the Infraspinatus muscle; the tendon of the Teres minor muscle; and the tendon of the Subscapularis muscle.

The abovementioned tendons are the rotator cuff tendons. Injuries, such as tendon tears, with respect to the rotator cuff tendons are a relatively common causes of shoulder pain. Implementing the method according to the first aspect with respect to the rotator cuff tendons advantageously provides automated determination with respect to a common cause of shoulder pain. This may advantageously save a large amount of a medical professionals' time.

Optionally, the data processing system is a neural network system including: a first neural network trained using a first set of training data, the first set of training data including a set of ground truth output images in which information relating to the region of interest is indicated; and a second neural network trained using a second set of training data, the second set of training data including a set of ground truth output images in which information relating to the one or more characteristics of the one or more abnormalities is indicated; and the method includes: performing the identification process using the first neural network; and performing the determination process using the second neural network.

Employing neural networks trained using appropriate sets of training data provide a robust way of processing the medical image data. Neural networks may deal with complex medical image data and provide more accurate results than other prior art computational techniques for image processing.

Optionally, the data processing system is a neural network system including a neural network for performing the identification process and the determination process, the neural network being trained using a single training process.

Using the same neural network trained using a single training process to perform the identification process as well as the determination process may be more advantageous than using separate neural networks. This is because, by utilizing a single end-to-end training mechanism, the identification process and the determination process can be trained at the same time.

Optionally, the identification process includes cropping the medical image data to the subset of image data.

Cropping the image data to the subset may improve the accuracy of the results of the determination process. The cropping advantageously means that irrelevant data is omitted and does not have to be somehow dealt with in a subsequent process.

Optionally, the method includes performing, at the data processing system, a locating process to identify a location of the one or more abnormalities.

Performing a locating process advantageously gives a medical professional more relevant information regarding the abnormality. The location of an abnormality may aid treatment planning. For example, the location of a tendon tear may need to be known for planning aspects of a related surgery.

Optionally, the medical image data includes magnetic resonance imaging data.

Implementing the method for MRI data advantageously allows automation of the processing of data from a commonly used medical imaging technique. For example, MRI imaging is used to diagnose rotator cuff tendon tears. MRI imaging is also used for various other medical imaging applications.

Optionally, the one or more abnormalities include a tendon tear of the one or more target tendons.

Advantageously, the method according to the first aspect can be applied to tendon tears which is a specific type of abnormality that may occur with a tendon.

Optionally, the determination process is a classification process for classifying the one or more target tendons with respect to the tendon tear based on the one or more characteristics.

Providing a classification with respect to the tendon tear advantageously indicates the type/extent of the tendon tear (as well as other aspects of the tendon tear). This may be helpful in selecting the type of treatment, for example.

Optionally, the classification attributed to the one or more target tendons is selected from a list of classifications including two or more different classifications, each classification in the list indicating: no tendon tear; a presence of a tendon tear; a partial tear; a low grade partial tear; a high grade partial tear; or a full tear.

Advantageously, the classification is selected from a list including classifications which specifically indicate the type of tendon tear.

Optionally, the abnormality data includes a report indicating information regarding the one or more abnormalities, wherein the information includes one or more of: a score describing the likelihood of the one or more abnormalities being present; a map describing the likelihood of the one or more abnormalities being present as a function of location in the medical image data; the type of the one or more abnormalities; the location of the one or more abnormalities; the size of the one or more abnormalities; a representative image of the one or more abnormalities; an indication of the confidence level relating to the one or more determined characteristics; an indication of a possible diagnosis; and an indication of a possible treatment plan.

Incorporating the provision of a report in the method advantageously provides a method for reporting on abnormalities in a manner free from inter-observer variability. Reports can be consistent with one another and may be configured to provide all the available information that a medical professional desires to see.

According to a second aspect, there is provided a computer readable storage medium, storing: one or more neural networks trained to determine one or more characteristics relating to one or more abnormalities relating to one or more target tendons in medical image data; and instructions that, when executed by a processor, cause the processor to: receive medical image data; provide the medical image data to the one or more neural networks to perform: an identification process to identify a subset of the medical image data representing a region of interest including one or more target tendons; and a determination process including processing the subset of the medical image data to determine one or more characteristics relating to one or more abnormalities of the one or more target tendons; and output abnormality data relating to the one or more abnormalities, the data being based on the one or more characteristics.

Providing a computer readable storage medium allows the advantageous method according to the first aspect to be used, for example, by medical professionals. The computer readable storage medium allows access to the method according to the first aspect which has the above described advantages.

According to a third aspect, there is provided an apparatus for processing medical image data. The apparatus includes one or more processors; and a memory storing: one or more neural networks trained to determine one or more characteristics relating to one or more abnormalities relating to one or more target tendons in medical image data; and instructions that, when executed by the one or more processors, cause the one or more processors to: receive medical image data; provide the medical image data to the one or more neural networks to perform: an identification process to identify a subset of the medical image data representing a region of interest including one or more target tendons; and a determination process including processing the subset of medical image data to determine one or more characteristics relating to one or more abnormalities of the one or more target tendons; and output abnormality data relating to the one or more abnormalities, the data being based on the one or more characteristics.

The third aspect advantageously provides hardware for implementing the method according to the first aspect, which has the above-described advantages.

Optionally, the apparatus according to the third aspect includes an imaging apparatus configured to acquire the medical image data.

Incorporated the imaging apparatus advantageously provides an apparatus which can perform the additional task of acquiring the relevant medical image data. The apparatus may be provided as a single system that can acquire the relevant medical images and also process them according to the described advantageous method.

Optionally, the apparatus according to the third aspect includes an input interface for allowing a user of the apparatus to override and/or manually correct the output of the apparatus.

The input interface advantageously allows the user to make changes to the output as required. The user can therefore modify the output if the results are judged to be inaccurate, for example.

BRIEF DESCRIPTION OF THE DRAWINGS

The present invention will now be described, by way of example only, with reference to the accompanying drawings in which.

DETAILED DESCRIPTION

Figure 1:
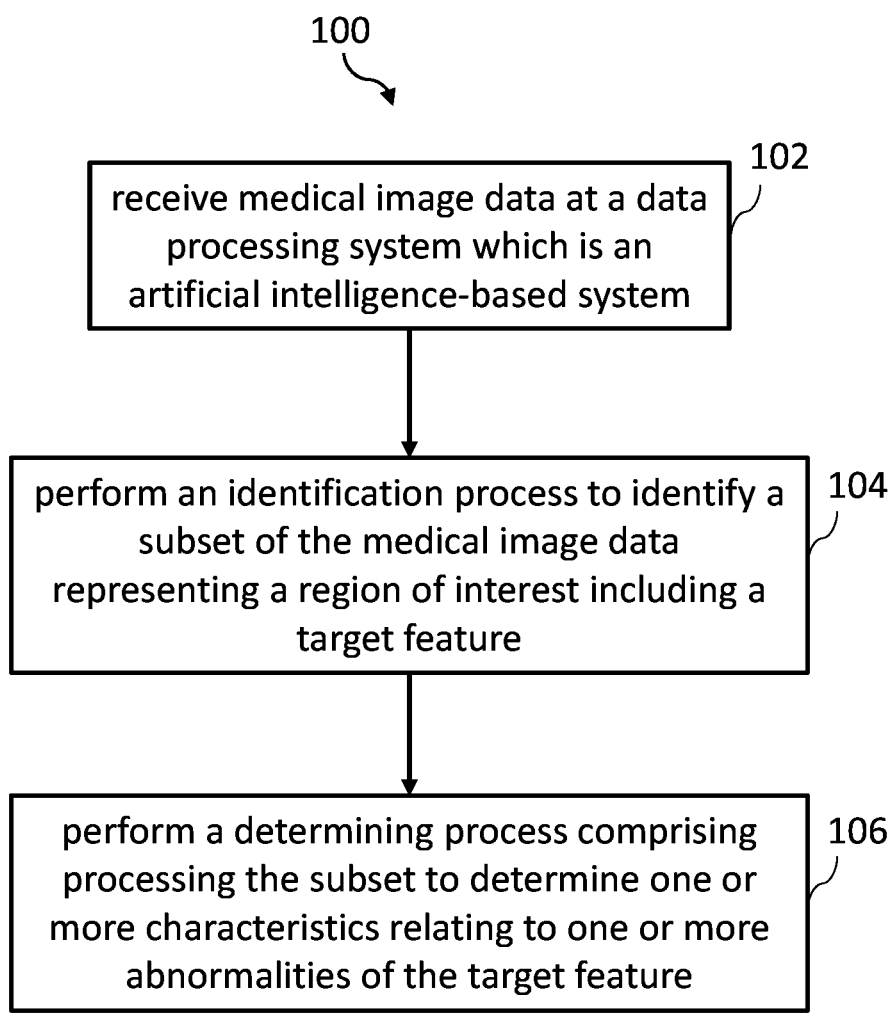
FIG. 1 is a flow diagram illustrating a method for processing medical image data, according to an example.

FIG. 1 is a block diagram illustrating a method 100 for processing medical image data. The method 100 is hereafter referred to as the medical image processing method 100. At block 102 of the medical image processing method 100, medical image data is received at a data processing system. The data processing system may be an artificial intelligence-based system, such as a machine learning-based system. Examples and further details regarding the data processing systems are provided further below. The medical image data may be MRI image data, X-ray image data, computed tomography scan data, ultrasound data, or any other kind of medical image data that may be analyzed to identify abnormalities within a human or animal body.

At block 104, an identification process is performed, at the data processing system, to identify a subset of the medical image data representing a region of interest including one or more target tendons.

The medical image data may represent an image volume within the human or animal body. For example, the medical image data may include a set of two dimensional (2D) images in one or more imaging planes (e.g. the sagittal plane, coronal plane and transverse plane). It will be understood that each 2D image may be made up of a number of pixels. In some examples, the medical image data may have been acquired using a three dimensional (3D) acquisition process and may be in a 3D format. In the 3D format example, the image may be made up of a number of voxels. In the following discussions we provide examples in which the medical image data is MRI data, for example a series of 2D MRI images. However, it will be appreciated that other types of image data may be used.

In the following examples, the region of interest is a region of the image volume represented by the MRI image data where at least a part of the one or more target tendons is present. The subset of medical image data is, for example, the subset of pixels of the MRI images which correspond to the region of interest.

The region of interest may be a shoulder region of a human or animal body. The one or more target tendons may include the tendons of the rotator cuff muscles. For example, the one or more target tendons may include at least one of the tendon of the Supraspinatus muscle, the tendon of the Infraspinatus muscle, the tendon of the Teres minor muscle and the tendon of the Subscapularis muscle. The following examples are in the context of a single target tendon, which is a rotator cuff tendon.

At block 106 of the medical image processing method 100, a determination process is performed at the data processing system. The determination process includes processing the subset of medical image data to determine one or more characteristics relating to one or more abnormalities of the target tendon. The one or more characteristics may relate to the morphology of the target tendon, a size of the target tendon or its respective muscle, topographical features of the target tendon, the position of parts of the target tendon with respect to other features (e.g. bones), whether parts of the target tendon are detached from one another or detached from another feature (e.g. the muscle or the bone attached to the target muscle), and the like.

The one or more abnormalities may include physical injuries such as damage. For example, the damage may be a tendon tear of the target tendon. The following examples are in the context of a tear of the target tendon.

Determining the one or more characteristics may enable detection and determination of the type of abnormality (if an abnormality is present) relating to the target tendon. There may be a classification of the target tendon with respect to the tendon tear, for example. The determination process may be a classification process as described further below. The classification process may be for classifying the target tendon with respect to the tendon tear based on the one or more characteristics. The classification attributed to the target tendon may be selected from a list of classifications including two or more different classifications. Each of the classifications in the list may indicate no tendon tear, a presence of a tendon tear, a partial tear, a low grade partial tear, a high grade partial tear, or a full tear, for example. In some examples, the list of classifications may include classifications that indicate information other than the type of tendon tear. For examples, the list of classifications may include one or more classifications indicating the extent of the tear, a degree of retraction with respect to the tendon tear, or other classifications which may provide useful information to a medical professional, for example, for planning treatment. It should be appreciated that the classifications described herein do not for an exhaustive list.

Alternatively to the determination process being a classification process, the determination process may be a regression process, herein referred to as an abnormality regression process, for detecting and determining the type of abnormality (e.g. the type of tendon tear if a tendon tear is present). For example, the abnormality regression process may include processing the region of interest and outputting an abnormality value indication the type of abnormality. For example, the abnormality value indicating that no tendon tear is present may be "0", for a partial tear it may be "1" and for a full tear it may be "2". An example of the determination process as an abnormality regression process is described further below.

At block 108 of the medical image processing method 100, abnormality data relating to the one or more abnormalities (the tendon tear, in the present examples) is output. The abnormality data is based on the one or more characteristics.

The abnormality data may include a report indicating information regarding the tendon tear obtained from preceding blocks of the medical image processing method 100. This information may include one or more of the following. A score describing the likelihood of the tendon tear being present may be determined and provided as part of the report. A map (e.g. a heat map) describing the likelihood of the tendon tear being present as a function of location in the MRI images may be determined and provided as part of the report. The information may indicate the type of the tendon tear (e.g. partial, full, etc.), its location, the size of the tendon tear; and/or a representative image of the tendon tear (e.g. one of the MRI images which clearly shows the tendon tear). An indication of the confidence level relating to the one or more determined characteristics may be determined and included in the report. Moreover, an indication of a possible diagnosis and/or an indication of a possible treatment plan may be determined and included in the report. The report may include any information that can be obtained from the processing performed as part of the medical image processing method 100 which may help a medical professional to make decisions with respect to the tendon tear (e.g. whether surgery should be performed, etc.).

In some examples, further processing may be performed. For example, the medical image processing method 100 may also include performing a locating process to identify a location of the one or more abnormalities (in the present example, the location of the tendon tear).

Figure 2:
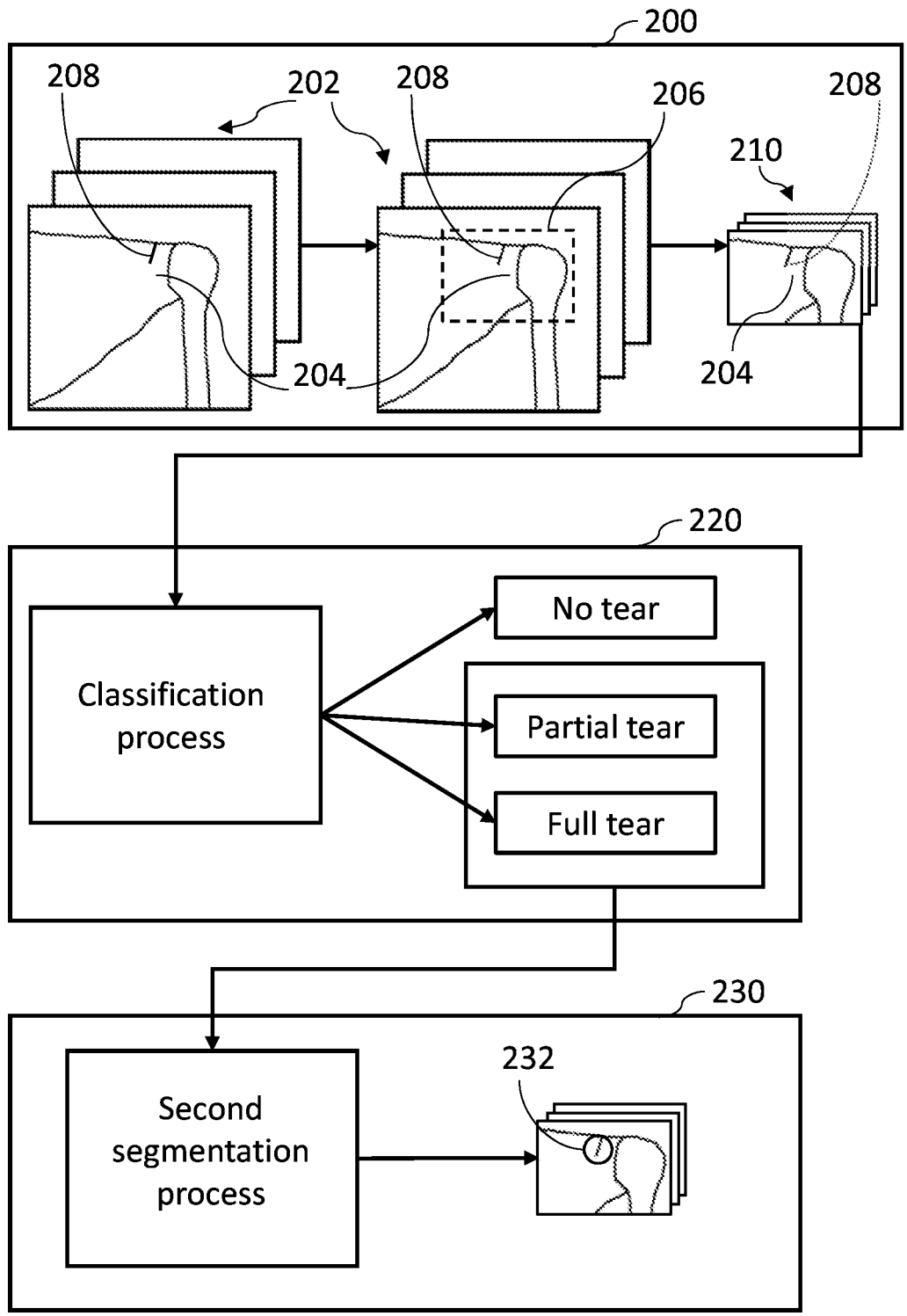
FIG. 2 is a schematic diagram representing processes that may be performed as part of the method illustrated in FIG. 1, according to an example.

Further examples of processes described above in relation to the medical image processing method 100 are hereafter described with reference to FIG. 2. FIG. 2 illustrates an example 200 of the identification process described above in relation to block 104. In this example, MRI image data 202 corresponding to a target tendon 204 is received.

The example identification process 200 includes processing the MRI image data 202 using an artificial intelligence-based (AI-based) system to identify the subset representing a region of interest 206. The region of interest 206 may be a portion of one or more of the 2D MRI images in the MRI image data 202, for example. The region of interest 206 may be identified such that it includes at least a part of the target tendon 204. The region of interest 206 may be identified using one of a number of different AI-based systems. Some examples of the identification of the region of interest 206 are illustrated in FIGS. 3A to 3C.

Figure 3A:
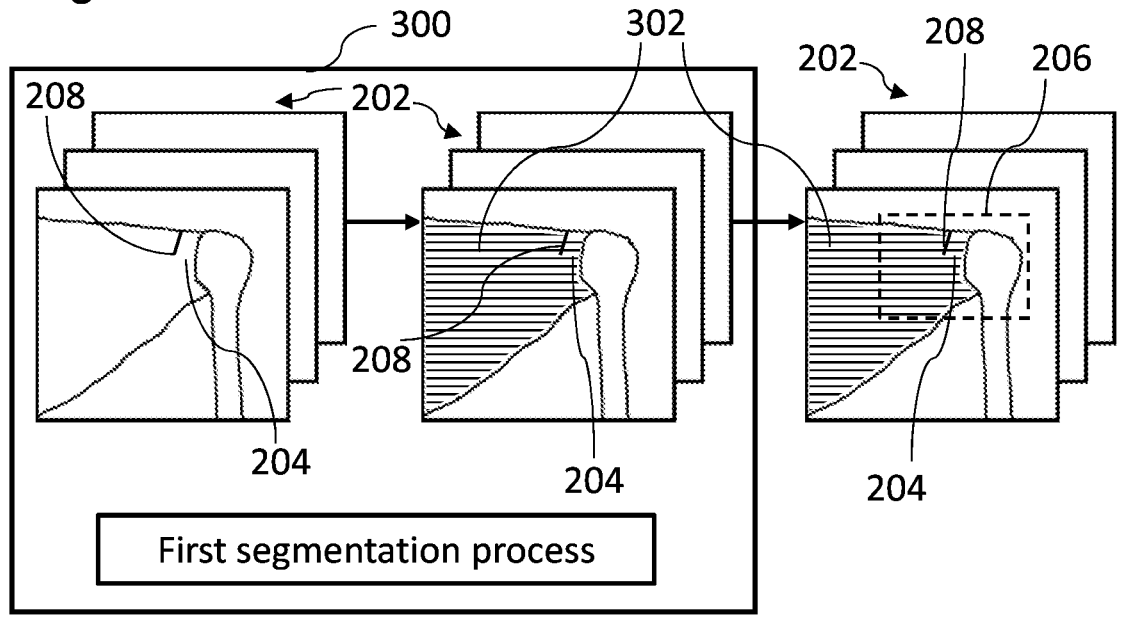
FIG. 3A is a schematic diagram illustrating a first process performed as part of an identification process, according to an example.
Figure 3B:
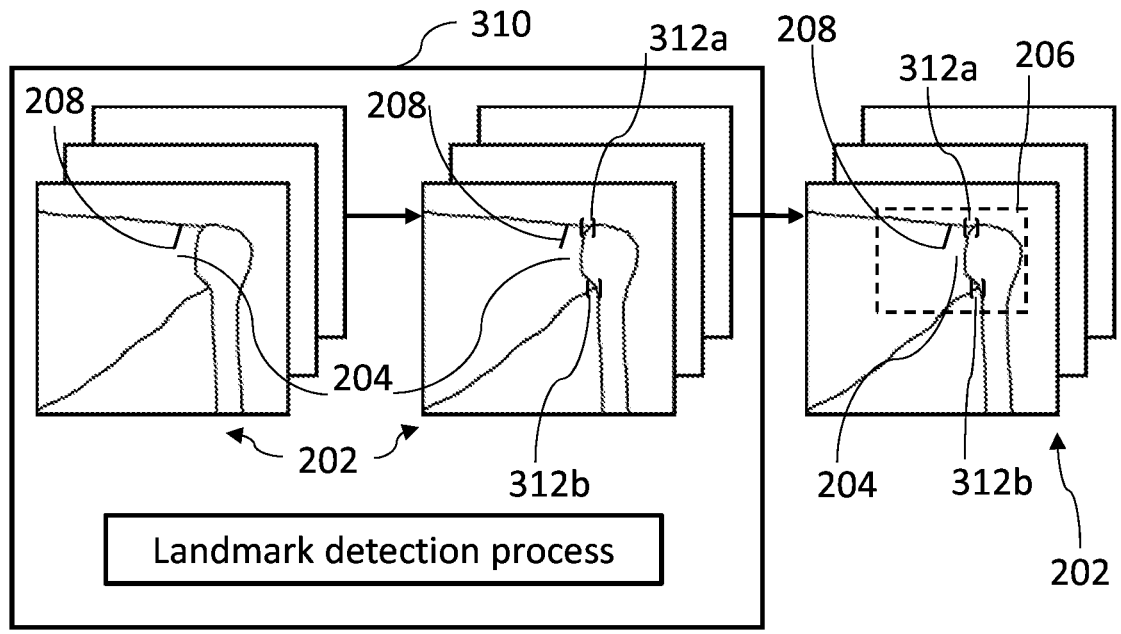
FIG. 3B is a schematic diagram illustrating a second process performed as part of an identification process, according to an example.
Figure 3C:
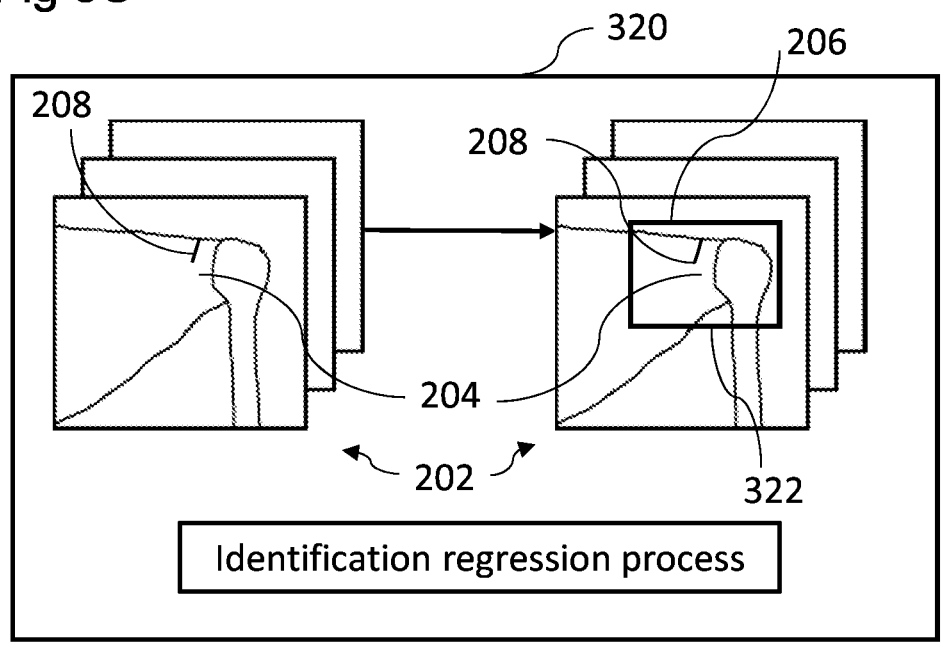
FIG. 3C is a schematic diagram illustrating a third process performed as part of an identification process, according to an example.

FIG. 3A illustrates a first example of the identification process 200 including a first segmentation process 300 to determine a mask relating to the target tendon 204 in the MRI image data 202. The mask may be a mask of the target tendon 204 or may be of the target tendon 204 and its respective muscle. In the example of FIG. 3A, the mask is a target feature mask 302 of the target tendon 204 and its respective muscle. In other examples, the mask may be a mask of another features, for example, a feature adjacent the target tendon 204, based on which mask the region of interest 206 can be identified. The target feature mask 302 is effectively a highlighted region of the MRI image data 202 determined to be the region where the target tendon 204 is present. For example, once segmented, a given MRI image may include an indication of a "0" for those pixels determined not to represent the target tendon 204, and a "1" for those pixels determined to represent the target tendon 204.

The segmentation of the MRI image data 202 may be performed using an AI-based system configured to perform segmentation of images. In some examples, a machine learning-based system may be used. For example, a deep learning-based (DL-based) segmentation process may be used which uses a neural network such as a convolutional neural network (CNN) employing an encoding and decoding mechanism which has an encoding stage and a decoding stage. In such examples, in the encoding stage, a given input MRI image is projected into non-linear sub-spaces. At earlier layers in the encoding stage, projecting the input MRI image in this way may lead to the identification of simple features (e.g. edges, corners, etc.). In later layers in the encoding stage, more complex features may be identified (e.g. particular shapes, etc.). The output of the decoding stage may be a segmented image corresponding to the input MRI image in which the target tendon 204 is highlighted by means of the target feature mask 302.

In the example of FIG. 3A, the target feature mask 302 of the target tendon 204 and its respective muscle is determined using the first segmentation process 300 described above.

The region of interest 206 may then be identified based on the target feature mask 302. The region of interest may include at least a part of the target tendon 204 as identified in the first segmentation process 300, as illustrated in FIG. 3A. For example, once the target tendon 204 is identified, the region of interest 206 may be identified as the region of the target tendon 204 where a tendon tear 208 is likely to be. The region of interest may be identified by the pixels (or voxels in the 3D case) of the MRI images included in the region of interest being labelled as part of the region of interest. For example, the pixels not included in the region of interest may be labelled with a "0" and the included pixels may be labelled with a "1". In some examples, a region of the MRI image data 202 may be identified as the region of interest by means of a bounding box, or the like.

The segmentation process 300 may advantageously yield detailed localization of the region of interest because segmentation provides rich details of the shape, position, etc. of the target tendon 204.

FIG. 3B illustrates a second example of the identification process 200, including a landmark detection process 310. The landmark detection process 310 is a process to detect at least one landmark relating to the target tendon 204. For example, the landmark detection process 310 may detect the location of certain features relating to the target tendon 204 in the MRI image data 202. For example, the landmark detection process 310 may detect the locations at which the target tendon 204 attaches to the relevant bone.

The landmark detection process 310 may be performed using an AI-based system configured to perform landmark detection on images. In some examples, a machine-learning system, such as a DL-based system using a CNN similar to the one previously described may be employed, excepting that, in this example, the DL-based system would be a landmark detection system rather than a segmentation system. For example, a deep image-to-image network (DI2IN) may be used. The DI2IN may output a volume where the voxel intensity l(x) at location x is defined by the Gaussian distribution represented in Equation (1) below. This output volume may function as a landmark mask for the desired landmark. In the example of a set of 2D MRI images, the volume may be defined by certain regions of one or more of the MRI images. The voxel intensity l(x) may be the intensity of the pixels of the MRI images making up that volume.

$$l(x) = \frac{1}{\sigma\sqrt{2\pi}} e^{-(x-\mu)^2/2\sigma^2} \quad (1)$$

In Equation (1), $\mu$ represents the location of the landmark being detected and $\sigma$ is the standard deviation. Accordingly, the DI2IN may output a Gaussian landmark mask centered on the location of the landmark being detected.

In the example illustrated in FIG. 3B, the landmark detection process 310 includes identification of a first landmark location 312a and a second landmark location 312b. The region of interest 206 may then be determined based on the first landmark location 312a and the second landmark location 312b, so as to include the first and second landmark locations 312a, 312b. In other examples, only one landmark location or more than two landmark locations may be detected, and the region of interest 206 determined so as to include the detected landmark or landmarks. In some examples, the region of interest 206 may be determined based on the detected landmark location(s) without necessarily including the detected landmark location(s). For example, the detected landmark location(s) may be used as reference points to identify where the region of interest 206 should be located. The region of interest 206 may be identified by the relevant pixels (or voxels) being labelled as part of the region of interest, by a bounding box, etc. (as described above).

FIG. 3C illustrates a third example of the identification process 200. In this example, the identification process 200 includes an identification regression process 320. The identification regression process 320 is a process to locate a bounding box 322 around at least a part of the target tendon 204, without requiring segmentation or landmark detection as described above. The identification regression process 320 may be performed using an AI-based system configured to perform a regression process in relation to an image. The AI-based system for performing the identification regression process 320 may be a machine learning-based system trained to locate the bounding box 322 using, for example, ground truth MRI images in which the desired position, size and orientation of the bounding box is indicated. Thus, the AI-based system for the identification regression process 320 may be trained to locate the bounding box 322 over the desired region of interest. Training of the described AI-based systems is further discussed below in the context of the data processing system.

The identification regression process 320 may include the determination of the location coordinates of the bounding box 322 (e.g. x, y and z coordinates), size parameters of the bounding box 322 (e.g. height, width and depth), and orientation parameters of the bounding box 322 (e.g. angles $\theta_x$, $\theta_y$, and $\theta_z$ which are angles about the x, y and z axes defined with respect to the MRI images in question) for each 2D MRI image, for example. The described coordinates and parameters may be determined such that the bounding box 322 indicates the region of interest 206.

As described above, with the segmentation process 300 and the landmark detection process 310, the region of interest is identified after the segmentation or landmark detection (as the case may be) is performed. Advantageously, the identification regression process 320 results in the region of interest being identified directly as an output because the AI-based system performing the identification regression process 320 is trained to position the bounding box 322 over the region of interest 206. Therefore, in this example, the region of interest 206 does not have to be identified as a separate task.

Although the first segmentation process 300, the landmark detection process 310, and the identification regression process 320 involve different processing as described above, the output of each of these processes is the identification of the region of interest 206. As described above, the region of interest is a region of the image volume represented by the MRI image data 202. Therefore, in the case of the MRI image data being a set of 2D MRI images, the region of interest 206 may include pixels from one or more of the 2D MRI images.

The above-described AI-based systems may be machine learning-based systems trained using labelled training data in order to generate the described outputs. The manner in which the described AI-based systems may be trained is described further below in the context of the make-up of the data processing system.

Referring again to FIG. 2, the identification process 200 may also include cropping the MRI image data 202 to the subset of medical image data representing the region of interest 206. In other words, the MRI image data 202 may be cropped resulting in cropped MRI image data 210 which include the region of interest 206, as identified by one of the first segmentation process 300, the landmark detection process 310 or the identification regression process 320, for example.

FIG. 2 illustrates an example determination process 220. The cropped MRI image data 210 may be input into the determination process 220 as in the example of FIG. 2. Although in the example of FIG. 2, the MRI image data 202 is cropped, in some examples, the MRI image data 202 may not be cropped. For example, the MRI image data 202 with the region of interest 206 identified may be input into the determination process 220 without being cropped. For example, if the segmentation process 300 is used, the target feature mask 302 along with the MRI image data 202 without any cropping may be input into the determination process 220. Processing according to the determination process 220 may then be performed on the identified region of interest 206 (for example, the region of the MRI image data 202 corresponding to the target feature mask 302).

In the example of FIG. 2, the cropped MRI image data 210 is generated and input into the determination process 220. In this example, the determination process 220 is a classification process for classifying the target tendon 204 with respect to the tendon tear 208 based on the one or more characteristics. In this example, the target tendon 204 is classified as either having no tear (e.g. if tendon tear 208 is not present), having a partial tear or a full tear, as illustrated in FIG. 2. In other examples, the classification may simply indicate whether or not the tendon tear 208 is present. As described above, in some examples, other classifications may be provided, for example, a quantification if the tendon tear 208 is a partial tear (e.g. a high grade or low grade partial tear), etc. The classification process 220 may be performed using an AI-based system, such as a neural network suitable for performing classification of images.

In other examples, the determination process 220 may be an abnormality regression process. The abnormality regression process may be a process to detect and determine a type of the tendon tear 208. The abnormality regression process may be performed using an AI-based system configured to perform a regression process in relation to an image. The AI-based system for performing the abnormality regression process may be a machine learning-based system trained to output an abnormality value indicating the type of tendon tear. As described above, the abnormality value indicating that no tendon tear is present may be "0", for a partial tear it may be "1" and for a full tear it may be "2". The AI-based system for performing the abnormality regression process may be trained using, for example, ground truth output images including: a set of no tear MRI images showing the target tendon with no tendon tear labelled with an abnormality value of "0", a set of partial tear MRI images showing the target tendon with a partial tear labelled with an abnormality value of "1" and a set of full tear MRI images showing the target tendon with a full tear labelled with an abnormality value of "2".

In some examples, the abnormality regression process may output a different number of abnormality values than described above (i.e. more or less than the three values described above). For example, the abnormality regression process may output abnormality values indicating whether there is a low grade partial tear or a high grade partial tear, etc.

The abnormality regression process may be advantageous because the abnormality values that are output bear a relationship to each other (i.e. "2" is a value further away from "0" indicating no tear than "1", for example). Therefore the abnormality regression process may advantageously provide an indication of the severity of the tendon tear 208.

As described, the medical image processing method 100 may involve identifying a location of the tendon tear 208. FIG. 2 illustrates an example locating process 230. For example, if the target tendon 204 is classified such that the tendon tear 208 is classified as a partial or a full tear, the locating process 230 may be performed to identify the location of the tendon tear 208.

In this example, the locating process 230 is a second segmentation process performed by a suitably configured AI-based system. For example, a DL-based system using a CNN using the encoding and decoding mechanism may be used. The second segmentation process may result in the location of the tendon tear being identified. For example, the tendon tear 208 may be highlighted in the region of interest 206 as a result of the second segmentation process.

The location 232 of the tendon tear 208 may then be indicated. The second segmentation process may also help with determination of other information such as the extent of the tear, for example, a size of the tendon tear 208.

Figure 4A:
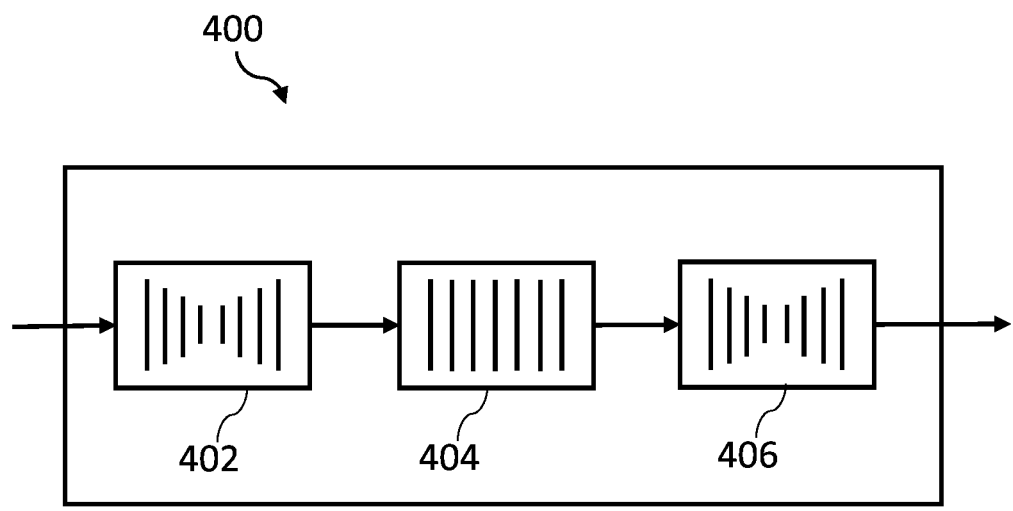
FIG. 4A is a schematic diagram illustrating a first data processing system, according to an example.
Figure 4B:
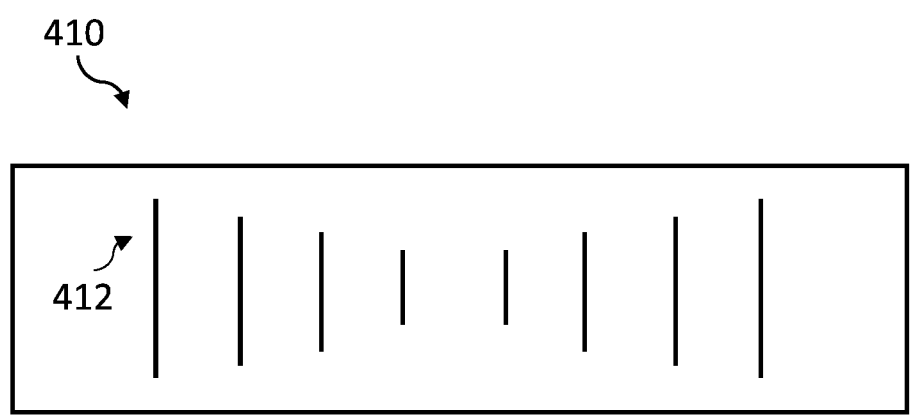
FIG. 4B is a schematic diagram illustrating a second data processing system, according to an example.

FIGS. 4A and 4B illustrate examples of the data processing system at which the above described processes may be performed. As described above, the data processing system is an AI-based system. The data processing system may include one or more AI-based sub-systems for performing the above described processes. FIG. 4A illustrates an example AI-based system 400 including a first AI-based sub-system, in the form of a first neural network 402, and a second AI-based sub-system in the form of a second neural network 404. The first neural network 402 may be trained using a first set of training data, the first set of training data including a set of ground truth output images in which information relating to the region of interest 206 is indicated. The second neural network 404 may be trained using a second set of training data, the second set of training data including a set of ground truth output images in which information relating to the one or more characteristics of the one or more abnormalities is indicated.

For example, the first and second neural networks 402, 404 may be trained using different sets of training data so that they can be used to perform different processes of the medical image processing method 100. The medical image processing method 100 may include performing the identification process using the first neural network 402 and the determination process using the second neural network 404.

For example, the first neural network 402 may be trained to perform the first segmentation process 300 described above. For example, the first neural network 402 may implement the described DL-based segmentation process using the encoding and decoding mechanism. The first set of training data may include given input MRI images of the shoulder region of the body where the target tendon 204 is present, and a first set of ground truth output images in which the target feature mask 302 is already indicated or labelled.

For example, during training, the first neural network 402 may process the given input MRI images and compare the generated output to the first set of ground truth output images. A first loss function indicating the error between the generated output and the first set of ground truth output images may be reduced by adjusting the weights which control the first neural network 402. The training process may be iterated to reduce or minimize the loss function as required.

In some examples, the first neural network 402 may be trained to perform the landmark detection process 310 described above. In these examples the first set of training data may include given input MRI images of the shoulder region of the body where the target tendon 204 is present (as above), and a second set of ground truth output images in which the desired landmarks have been identified or labelled. For example, the second set of ground truth output images may contain the above described Gaussian landmark masks of the desired landmarks so that their location is identified. It will be understood that the training process may be similar to that described for the context of the first segmentation process 300. For examples, outputs may be generated and the first loss function minimized by iterating the process.

In some examples, the first neural network 402 may be trained to perform the identification regression process 320 described above. The first set of training data may include given input MRI images of the shoulder region of the body where the target tendon 204 is present (as above), and a third set of ground truth output images in which respective bounding boxes are present to indicate the region of interest 206. In the training process, the first neural network 402 may generate coordinates and parameter for bounding boxes and compare them to the bounding boxes in the first set of training data. As above, this process may be iterated to minimize the first loss function.

The second neural network 404 may be trained to perform any of the examples of the determination process described above. For example, where the determination process is a classification process, the second set of training data may include given input MRI images of the shoulder region in which the region of interest 206 is indicated, and ground truth output images in which the classification of the target tendon 204 with respect to the tendon tear 208 has been labelled. A training process may be iterated to minimize a second loss function related to the error between the labelled classifications in the second set of training data and the output generated by the second neural network 404.

In examples where the determination process is an abnormality regression process, the second set of training data may include given input MRI images of the shoulder region in which the region of interest 206 is indicated, and ground truth output images in which the type of the abnormality (e.g. tendon tear) is labelled, for example, using an abnormality value. A training process may be iterated to minimize a second loss function, which in this case would be related to the error between the abnormality values output by the second neural network 404 and the abnormality values of the ground truth output images. In this example, the error may relate in a more direct manner to the severity of the abnormality (e.g. tendon tear).

In some examples, the data processing system 400 may include a third AI-based sub-system in the form of a third neural network 406 trained using a third set of training data. This may be the case, for example, where the locating process 230 is also performed. The third neural network 406 may be trained to perform the locating process 230. For example, the third neural network 406 may be trained to perform the second segmentation process.

The third set of training data may include given input MRI images of the shoulder region in which the region of interest 206 is labelled and the classification of the target tendon 204 with respect to the tendon tear 208 is provided. The third set of training data may also include ground truth output images in which the location 232 of the tendon tear 208 is identified/labelled. In a training process, the third neural network 406 may process the given input MRI images and compare the generated output to the respective indicated locations of the tendon tear 208 in the ground truth output images of the third set of training data. The training process may be iterated to minimize a third loss function as required. The third loss function may represent the error between the generated outputs and indicated locations of the tendon tear 208 in the third set of training data.

Examples of loss functions that may be used are cross-entropy loss functions, L1 loss functions and L2 loss functions. For example, a cross-entropy loss function may be used where the process in question is a classification process.

Accordingly, in the example of the data processing system 400, the different processes of the medical image processing method 100 may be performed by separate neural networks specifically trained to perform those processes.

In the example of FIG. 4B, a second data processing system 410 is a neural network system including a neural network 412 for performing the identification process and the determination process. The neural network of the second data processing system 410 may be referred to as the unitary neural network 412. The unitary neural network 412 may be trained using a single training process.

In this example, the unitary neural network 412 may perform the identification process and the determination process according to any of the described examples. In examples where the medical image processing method 100 includes the locating process, the unitary neural network 412 may also perform the locating process. Therefore, in this example, the same AI-based system, namely the unitary neural network 412, is used to perform two or more of the described processes.

The single training process may be a supervised training process in which the unitary neural network 412 is trained to identify the region of interest 206 and then process the region of interest to determine one or more characteristics relating to one or more abnormalities of the one or more target tendons. In examples where the locating process is included, the unitary neural network 412 may identify the location 232 of the tendon tear 412.

The single training process may involve using a set of training data including given input MRI images of the shoulder region of the body where the target tendon 204 is present, and ground truth output images in which the subset of the MRI images representing the region of interest 206 is identified, the desired classifications are provided (in the example of the determination process being a classification process), and (where the locating process is included) the location of the tendon tear 208 is provided. For example, the ground truth output images may be labelled, as appropriate.

Performing the different processes involved in the medical image processing method 100 using a single neural network, such the unitary neural network 412, trained using a single training process may be more advantageous than using different neural networks to perform the different processes. This is because, for example, by utilizing a single end-to-end training mechanism, the different processes can be trained at the same time.

The ground truth output images described above may be prepared based on examination of the images in question by medical professionals, for example. A medical professional may, for example, examine MRI images and provide labels or indications, as appropriate. For example, in the case of the identification regression process 320 described above, the medical professional may indicate the location of bounding boxes in the respective ground truth output images. For example, in the case of the classification process, the medical professional may provide a label corresponding to no tear, partial tear, etc., as appropriate for the respective ground truth output images. The ground truth output images for the other described examples may be similarly prepared by providing the appropriate information (e.g. labels, indications, etc.).

In some examples, other information may be taken into account in the preparation of ground truth output images. For example, an indication or label for a given image may be provided taking into account a report from a surgical procedure relating to the region represented by the given image. For example, the surgical procedure may be an arthroscopic surgery. The report from the surgical procedure may indicate, for example, a partial tear, a full tear, etc., with respect to the one or more target tendons in the given image.

The above described examples of the medical image processing method 100 are described in the context of MRI images. The described medical image processing method 100 may be particularly useful for MRI images because of the large amount of data in, for example, a set of 2D MRI images. This is because, only the relevant data is processed further after it is identified in the identification process 200. However, the medical image processing method 100 may also be used for other types of medical image data such as X-ray image data, computed tomography scan data, ultrasound data, etc.

Figure 5:
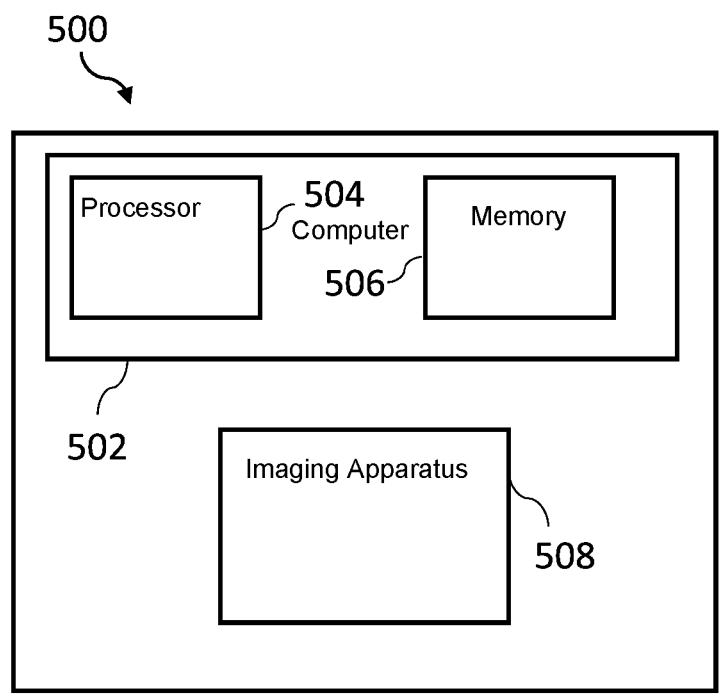
FIG. 5 is a schematic diagram illustrating a computing apparatus, according to an example.

FIG. 5 schematically illustrates an apparatus 500 for processing medical image data. The apparatus 500 includes a computing device in the form of a computer 502. The computer 502 includes one or more processors 504 and a memory 506. The memory 506 may be in the form of a computer readable storage medium. The memory 506 has stored on it one or more neural networks trained to determine one or more characteristics relating to one or more abnormalities relating to one or more target tendons in medical image data. For example, the memory 506 may have the neural networks described above stored on it. The memory 506 may also store instructions that when executed by the one or more processors 504, cause the one or more processors to perform the medical image processing method described above. The one or more processors may include one or more Graphics Processing Units (GPUs), for example, or other types of processors. The use of GPUs may optimize the apparatus 500 for making use of the described neural networks. This is because, as will be appreciated, a GPU can handle a large number of threads at the same time.

The one or more neural networks and the instructions may be stored on the memory 506 when the apparatus 500 is supplied to a user. Alternatively, the one or more neural networks and the instructions may be supplied thereafter (e.g. in the form of a computer program product) by means of a computer readable storage medium such as a compact disk (CD), a digital versatile disk (DVD), hard disk drive, solid state drive, a flash memory device and the like. Alternatively, the one or more neural networks and the instructions may be downloaded onto the storage medium 506 via a data communication network (e.g. the world-wide web).

In some examples, the apparatus 500 may also include an imaging apparatus 508 configured to acquire the medical image data. For example, the apparatus 500 may include an MRI image acquisition machine as well as the computer 502.

In some examples, the apparatus 500 may include an input interface such as a mouse, a keyboard (or respective connection interfaces for connecting same), a touch screen interface and the like. A user of the apparatus 500 may use the input interface to input information into the apparatus 500. For example, the user may manually correct and/or override the output of the apparatus 500. For example, if the apparatus 500 provides a classification, based on medical image data, that a tendon tear is not present and the user judges that a tendon tear is in fact present, the user may change the classification, indicate the location of the tendon tear, etc.

While the invention has been illustrated and described in detail in the context of specific examples, the invention is not limited to the disclosed examples. Other variations can be deducted by those skilled in the art without leaving the scope of protection of the claimed invention.

In summary, disclosed is a method, a computer readable storage medium and an apparatus for processing medical image data. Medical image data is received at a data processing system which is an artificial intelligence-based system. An identification process is performed at the data processing system to identify a subset of the medical image data representing a region of interest including one or more target tendons. A determination process is performed at the data processing system to determine one or more characteristics relating to one or more abnormalities of the one or more target tendons. Abnormality data is output, the abnormality data relating to the one or more abnormalities and being based on the one or more characteristics.

The invention claimed is:

1. A method for processing medical image data, the method comprising:
   receiving medical image data at a data processing system, the data processing system being an artificial intelligence-based system;
   identifying, by the data processing system, a region of interest including one or more target tendons;
   cropping, by the data processing system, the medical image data to the region of interest;
   determining, by the data processing system, from the cropped medical image data one or more characteristics relating to one or more abnormalities of the one or more target tendons; and
   outputting abnormality data relating to the one or more abnormalities, the abnormality data being based on the one or more characteristics,
   wherein the data processing system is a neural network system comprising a neural network for performing the identifying and the determining, the neural network having been trained to perform both the identifying and the determining using a single training process.

2. The method according to claim 1, wherein identifying comprises:
   determining a mask relating to the one or more target tendons in the medical image data;
   detecting at least one landmark relating to the one or more target tendons; or
   locating, by a regression process, a bounding box around at least a part of the one or more target tendons.

3. The method according to claim 1, wherein:
   the region of interest is a shoulder region of a human or animal body.

4. The method according to claim 3, wherein the one or more target tendons comprise at least one of:
   the tendon of a Supraspinatus muscle;
   the tendon of a Infraspinatus muscle;
   the tendon of a Teres minor muscle; and
   the tendon of a Subscapularis muscle.

5. The method according to claim 1, wherein:
   the data processing system is a neural network system comprising:
   a first neural network trained using a first set of training data, the first set of training data comprising a set of ground truth output images in which information relating to the region of interest is indicated; and
   a second neural network trained using a second set of training data, the second set of training data comprising a set of ground truth output images in which information relating to the one or more characteristics of the one or more abnormalities is indicated; and the method comprises:
   identifying using the first neural network; and
   determining using the second neural network.

6. The method according to claim 1, further comprising:
   identifying, by the data processing system, a location of the one or more abnormalities.

7. The method according to claim 1, wherein the medical image data comprises magnetic resonance imaging data.

8. The method according to claim 1, wherein:
   the one or more abnormalities comprise a tendon tear of the one or more target tendons.

9. The method according to claim 8, wherein:
   determining comprises classifying the one or more target tendons with respect to the tendon tear based on the one or more characteristics.

10. The method according to claim 9, wherein:
the classification attributed to the one or more target tendons is selected from a list of classifications comprising two or more different classifications, each classification in the list indicating:
no tendon tear;
a presence of a tendon tear;
a partial tear;
a low grade partial tear;
a high grade partial tear; or
a full tear.

11. The method according to claim 1, wherein:
the abnormality data comprises a report indicating information regarding the one or more abnormalities, wherein the information comprises one or more of:
a score describing the likelihood of the one or more abnormalities being present;
a map describing a likelihood of the one or more abnormalities being present as a function of location in the medical image data;
a type of the one or more abnormalities;
a location of the one or more abnormalities;
a size of the one or more abnormalities;
a representative image of the one or more abnormalities;
an indication of a confidence level relating to the one or more determined characteristics;
an indication of a possible diagnosis; and
an indication of a possible treatment plan.

12. A non-transitory computer readable storage medium storing one or more neural networks trained to determine one or more characteristics relating to one or more abnormalities relating to one or more target tendons in medical image data and storing instructions that, when executed by a processor, cause the processor to:
receive medical image data;
provide the medical image data to the one or more neural networks to perform:
an identification process to identify a region of interest including one or more target tendons;
a cropping process to crop the medical image data to the region of interest;
a determination process comprising processing the cropped medical image data to determine one or more characteristics relating to one or more abnormalities of the one or more target tendons; and
output abnormality data relating to the one or more abnormalities, the data being based on the one or more characteristics,
wherein the one or more neural networks comprise a neural network for performing the identifying process and the determining process, the neural network having been trained to perform both the identifying and the determining using a single training process.

13. An apparatus for processing medical image data, the apparatus comprising:
one or more processors; and
a memory storing:
one or more neural networks trained to determine one or more characteristics relating to one or more abnormalities relating to one or more target tendons in medical image data; and
instructions that, when executed by the one or more processors, cause the one or more processors to:
receive medical image data;
provide the medical image data to the one or more neural networks to:
identify a region of interest in the medical image data including one or more target tendons;
crop the medical image data to the region of interest;
determine, from the cropped medical image data, one or more characteristics relating to one or more abnormalities of the one or more target tendons; and
output abnormality data relating to the one or more abnormalities, the data being based on the one or more characteristics,
wherein the one or more neural networks comprise a neural network configured to identify the subset of the medical image data and to determine the one or more characteristics, the neural network having been trained both to identify and to determine using a single training process.

14. The apparatus according to claim 13, further comprising an imaging apparatus configured to provide the medical image data.

15. The apparatus according to claim 13, further comprising:
an input interface for allowing a user of the apparatus to override and/or manually correct the output of the apparatus.

* * * * *